Oct. 30, 1923.
E. J. HAVERSTICK
1,472,169
ELECTROLYTE FOR ELECTROLYTIC CONDENSERS
Filed March 23, 1921
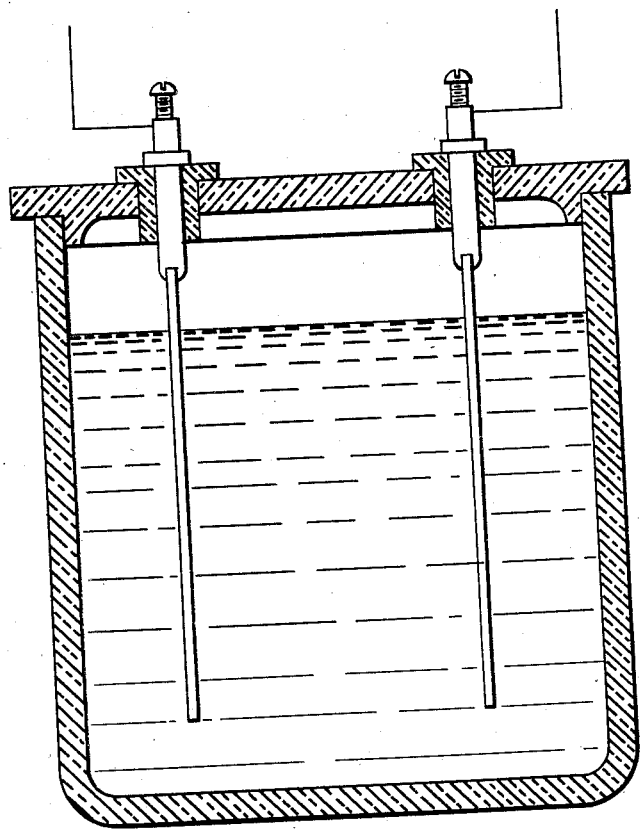
A Solution of an Aluminate, a Phosphate and a Fluoride
WITNESSES:
INVENTOR
Earl J. Haverstick.
BY
ATTORNEY Patented Oct. 30, 1923.

1,472,169

UNITED STATES PATENT OFFICE.

EARL J. HAVERSTICK, OF OAKMONT, PENNSYLVANIA, ASSIGNOR TO WESTINGHOUSE ELECTRIC & MANUFACTURING COMPANY, A CORPORATION OF PENNSYLVANIA.

ELECTROLYTE FOR ELECTROLYTIC CONDENSERS.

Application filed March 23, 1921. Serial No. 454,892.

*To all whom it may concern:*

Be it known that I, EARL J. HAVERSTICK, a citizen of the United States, and a resident of Oakmont, in the county of Allegheny and State of Pennsylvania, have invented a new and useful Improvement in Electrolyte for Electrolytic Condensers, of which the following is a specification.

This invention relates to electrolytic cells, more particularly to cells adapted for use as electrolytic condensers, lightning arresters, rectifiers and the like.

Cells for the above-mentioned purposes comprise, generally, a plurality of film-forming electrodes, such as aluminum, immersed in a solution of a suitable electrolyte. The electrolyte should be stable and have a low power factor and should not form precipitates during the operation of the cell.

My invention is designed to provide a novel electrolyte which is particularly advantageous for use in that it does not form precipitates, gives a low power factor and is stable.

I have found that an electrolyte comprising a weak solution of an aluminate, a phosphate and a fluoride gives excellent results. A specific composition which I have found to be satisfactory is as follows:

Sod. aluminate 2.5 gms.,
Tri-sodium phosphate 11.5 gms.,
Sodium fluoride 3 gms.,
Distilled water 1200 cc.

In the accompanying drawing constituting a part hereof, the single figure thereof is a diagrammatic view of an electrolytic cell containing an electrolyte made in accordance with my invention and having a low power factor or internal loss of energy in the cell.

An electrolyte of this character gives a power factor between 3% and 4% even after operating continuously for long periods of time. The power factor is the ratio of the dissipation of energy in the cell to the energy supplied to the system, generally appearing as heat and representing a loss of power. The electrodes are always clean and no precipitates are formed in operation.

I claim as my invention:

1. An electrolyte for electrolytic condensers, lightning arresters, rectifiers and the like which comprises a solution of an aluminate, a phosphate and a fluoride.

2. An electrolyte for electrolytic condensers, lightning arresters, rectifiers and the like which comprises a solution of sodium aluminate, tri-sodium phosphate and sodium fluoride.

3. An electrolyte for electrolytic condensers, lightning arresters, rectifiers and the like which comprises a solution of sodium aluminate 2.5 grams, tri-sodium phosphate 11.5 grams, sodium fluoride 3 grams, in 1200 cc. water.

In testimony whereof, I have hereunto subscribed my name this 15th day of March, 1921.

EARL J. HAVERSTICK.